E. Z. LEWIS.
MANIFOLDING SALESMAN'S CHECK.
APPLICATION FILED APR. 8, 1911.

1,024,731.

Patented Apr. 30, 1912.

Witnesses:

Inventor
Edward Z. Lewis
by Poole + Brown Attys

UNITED STATES PATENT OFFICE.

EDWARD ZUVER LEWIS, OF CHICAGO, ILLINOIS, ASSIGNOR TO THE GENERAL MANIFOLD AND PRINTING COMPANY, OF FRANKLIN, PENNSYLVANIA, A CORPORATION OF PENNSYLVANIA.

MANIFOLDING SALESMAN'S CHECK.

1,024,731.     Specification of Letters Patent.     Patented Apr. 30, 1912.

Application filed April 8, 1911. Serial No. 619,649.

*To all whom it may concern:*

Be it known that I, EDWARD ZUVER LEWIS, a citizen of the United States, and a resident of Chicago, in the county of Cook and State of Illinois, have invented certain new and useful Improvements in Manifolding Salesmen's Checks; and I do hereby declare that the following is a full, clear, and exact description thereof, reference being had to the accompanying drawings, and to the letters of reference marked thereon, which form a part of this specification.

This invention relates to a manifolding salesman's check and the object of the invention is to provide a sales check which is adapted not only to reproduce the original record made upon it in the form of a carbon copy upon the check located below the same, but which is also provided with means to prevent any erasure without detection, the erasure or attempted erasure producing on both sides of the original check an ineradicable smudge or blur that will call it to attention at a glance.

As shown herein, my improved sales check is applied to a salesman's check of the kind described in Letters Patent No. 972,551, issued to me on October 11th, 1910, and the particular check illustrated is one for meal service, such for example as is used on dining cars. In said check there is provided the original check upon which the order is written, two or more requisition checks, in this case cook's checks underlying said original check, upon which carbon impressions are made of what is written on the original check, and a backer or card to which the several checks are attached. After the order is written on the original check, the carbon copy of the same is torn out and sent to the cook. If additional orders are written, there remains another requisition or cook's check which receives a carbon reproduction of what is added to the bill. After this is detached the total is written on the original which is reproduced on the card.

The invention relates particularly to the construction of the original check and consists of the matters hereinafter described and more particularly pointed out in the appended claims.

Figure 1:
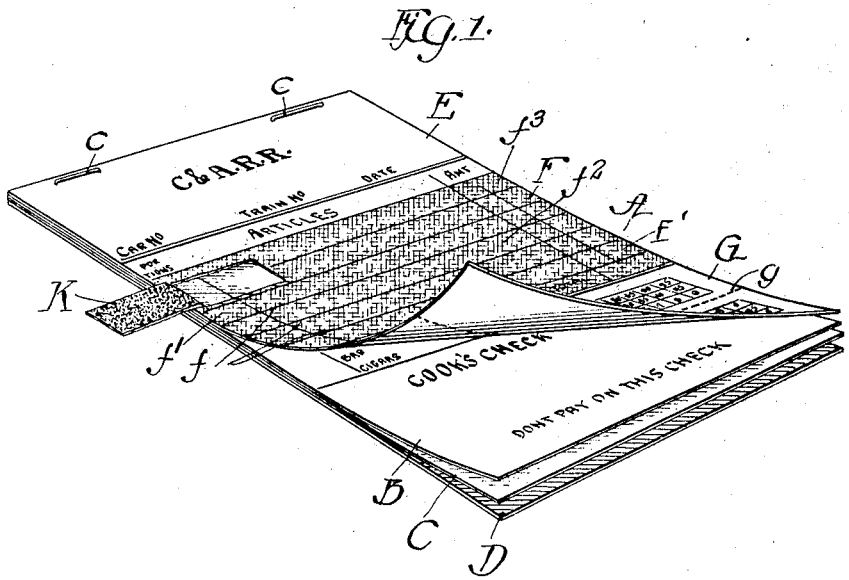
Figure 2:
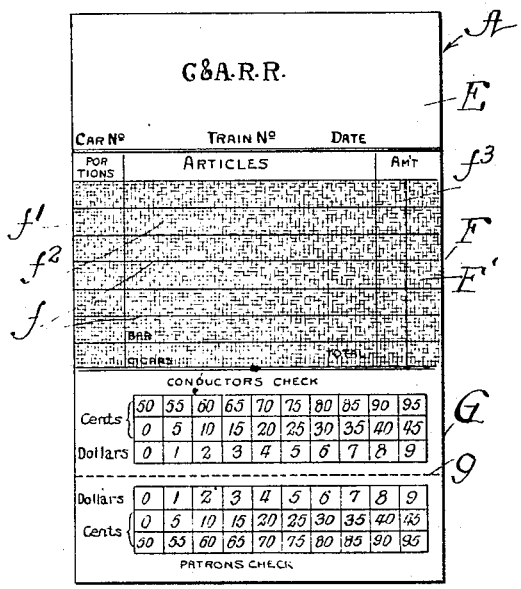
Figure 3:
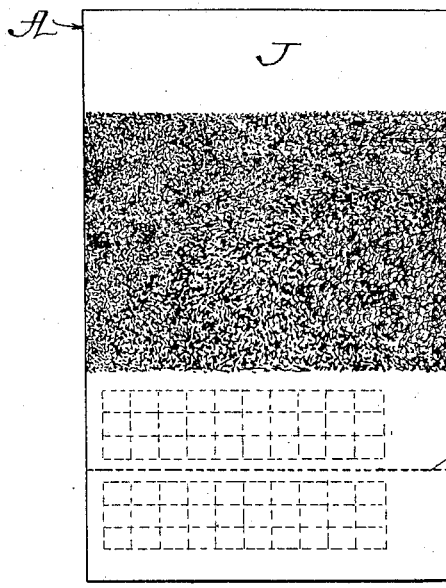

In the drawings—Figure 1 is a perspective view of a manifolding salesman's check provided with my improvements. Fig. 2 is a view representing a top plan view of the original check. Fig. 3 is a view representing a bottom plan view of the same.

Referring now in detail to the drawings, A indicates the original check, B and C requisition or cook's checks, and D a card-backer to which the several checks are secured by staples $c$ in the order named.

As illustrated in the drawings, the checks are printed as usual with any desired items and including any printed matter which may be required in the particular use to which the check is to be put.

As shown in the drawings, the original check A comprises a sheet which is divided on its front face into three sections E, F, G. The upper section E has printed upon it the usual data identifying the party in whose favor the check is issued,—for example—in this case the name of the railroad, the dining car number, train number and the like. This upper section may also contain the date line.

The intermediate section F is ruled in order to conveniently write thereon the items to be charged. In this case the check is shown as ruled horizontally by lines $f$ for the several items to be charged and vertically to provide a column $f'$ in which to write the number of portions, a wider column $f^2$ for the article charged for, and a column $f^3$ at the right for the amount to be charged for each article. At the bottom is a space for the total.

The bottom section is printed with duplicate punch checks in each of which may be punched the total amount of the bill, one of which is preferably made detachable by a line of perforations $g$ and is to be handed to the purchaser.

The intermediate section F containing a list of the articles charged for and the amounts charged is the one upon which there is danger of a dishonest salesman, in this case, the waiter, changing or attempting to change an item after it has been written. To make such change or alteration impossible without ready detection, I provide on the section F, comprising that part of the check upon which the items purchased and the amounts charged are to be written, a thin, light-colored coating F' of wax or the like. Said waxy coating is preferably of such consistency that it is not displaced, removed or scraped from the surface of the section F on which it is applied by the point of a pencil or other device used in writing thereon. The point of the pencil or other device when writing does not act as a stylus to remove the coating. The mark produced by the lead of the pencil or other device in writing is made on the top surface of the coating. Said mark being once made on the said coating cannot be erased without leaving an unsightly blur or smudge when the eraser is used, which will make the fact that an erasure has been made at once apparent upon a glance at the check.

When an eraser is rubbed over that part of the face of the check covered by the coating F' in order to erase a mark, the combined effect of the rubber of the eraser and of the carbon particles of the mark upon the wax coating is to produce a dark, dirty smudge on the surface of the wax, and continued rubbing, while it may lighten the tone of the smudge, cannot remove the effect of the erasure on the surface of the wax which will always be plainly apparent. Even if by continued rubbing the wax coating be entirely removed about the point where the erasure was made, the exposed surface of the paper will have an entirely different appearance to the eye from that of the surrounding smooth wax surface which will make the detection of the erasure absolutely certain.

The rear face J of the original check is provided with a coating of transfer material, preferably a carbon film or coating K adapted to produce carbon impressions on the sheet lying next below said original check. Preferably said carbon film extends only over the part of the check which is beneath the part of the obverse side which is to be written upon, this including in this case the section F and the lower part of the section E on which the car number, train number and date are to be written.

Any erasure or attempt at erasure on the original check will blur both sides of the original check, the rubbing of the eraser on the face of the original check causing a mark or blur on the carbon coating on the back of the same which will be substantially a reproduction of the mark or blur produced by the eraser on its face.

By omitting the wax film or coating on the top and bottom sections E, G, of the original check, parts are left for notation, remarks or other matter not required to be reproduced on the requisition check or checks and for conveniently handling the original check without touching the films or coatings of the check.

I claim as my invention:—

1. In a manifolding sales check including an original and one or more duplicate checks, an original check consisting of a sheet provided on its top face with a light colored wax-like coating adapted to be written upon, and said sheet being provided on its back with a coating of transfer material.

2. In a manifolding sales check including an original and one or more duplicate checks, an original check consisting of a sheet provided on its top face with a light colored wax-like coating adapted to be written upon, said wax-like coating covering the intermediate part of the face of the sheet which is designed to be written upon and leaving the parts of the sheet above and below said intermediate part free of said wax-like coating, and said sheet being provided on its back with a coating of transfer material located directly beneath the said wax-like coating on its face.

In testimony, that I claim the foregoing as my invention I affix my signature in the presence of two witnesses, this 4th day of April A. D. 1911.

EDWARD ZUVER LEWIS.

Witnesses:
 CLARENCE E. MEHLHOPE,
 GEORGE R. WILKINS.